US012362998B2

(12) United States Patent
Son et al.

(10) Patent No.: US 12,362,998 B2
(45) Date of Patent: Jul. 15, 2025

(54) APPARATUS AND METHOD FOR MANAGING MULTI-CLOUD COMPUTING INFRASTRUCTURE

(71) Applicant: ELECTRONICS AND TELECOMMUNICATIONS RESEARCH INSTITUTE, Daejeon (KR)

(72) Inventors: Seok-Ho Son, Daejeon (KR); Dong-Jae Kang, Daejeon (KR); Byoung-Seob Kim, Sejong-si (KR); Soo-Young Kim, Daejeon (KR); Yun-Kon Kim, Daejeon (KR); Seung-Jo Bae, Daejeon (KR); Ji-Hoon Seo, Sejong-si (KR); Byeong-Thaek Oh, Sejong-si (KR); Young-Woo Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/187,467

(22) Filed: Mar. 21, 2023

(65) Prior Publication Data

US 2023/0308353 A1 Sep. 28, 2023

(30) Foreign Application Priority Data

Mar. 25, 2022 (KR) ........................ 10-2022-0037403

(51) Int. Cl.
*H04L 41/08* (2022.01)
*G06F 9/48* (2006.01)
(Continued)

(52) U.S. Cl.
CPC ........ *H04L 41/0886* (2013.01); *G06F 9/4881* (2013.01); *H04L 43/0876* (2013.01); *H04L 47/83* (2022.05)

(58) Field of Classification Search
CPC . H04L 41/0886; H04L 47/83; H04L 43/0876; G06F 9/4881
See application file for complete search history.

(56) References Cited

U.S. PATENT DOCUMENTS 10,063,630 B2    8/2018  Kim
10,778,597 B1 *  9/2020  Tan ..................... H04L 41/0895
(Continued)

FOREIGN PATENT DOCUMENTS

KR    10-2012-0116773 A    10/2012
KR       10-2179459 B1     11/2020
(Continued)

*Primary Examiner* — Chris Parry
*Assistant Examiner* — Steven C Nguyen
(74) *Attorney, Agent, or Firm* — Rabin & Berdo, P.C.

(57) ABSTRACT

Disclosed herein are an apparatus and method for managing a multi-cloud computing infrastructure. The apparatus includes one or more processors and executable memory for storing at least one program executed by the one or more processors. The at least one program receives a request for autonomous operation of a multi-cloud computing infrastructure from a user, generates an information object having a name of a namespace corresponding to the multi-cloud computing infrastructure and previously generated universal unique identifier (UID) information, manages multiple resources included in the multi-cloud computing infrastructure, provisions the multi-cloud computing infrastructure by generating computing instances constituting the components of the multi-cloud computing infrastructure, manages the lifecycles of the computing instances, and performs the autonomous operation of the multi-cloud computing infrastructure depending on operation conditions for the multi-cloud computing infrastructure.

10 Claims, 10 Drawing Sheets

(51) Int. Cl.
*H04L 43/0876* (2022.01)
*H04L 47/83* (2022.01)

(56) References Cited

U.S. PATENT DOCUMENTS

| | | |
|---|---|---|
| 11,175,960 B2 | 11/2021 | Kim et al. |
| 2010/0042720 A1* | 2/2010 | Stienhans ............. G06F 9/5072 709/226 |
| 2013/0263209 A1* | 10/2013 | Panuganty .......... H04L 41/5025 709/224 |
| 2019/0286471 A1* | 9/2019 | Cao ....................... G06F 9/5077 |
| 2020/0356568 A1* | 11/2020 | Nawrocke ........... G06F 11/3006 |
| 2021/0136004 A1* | 5/2021 | Herle .................. H04L 61/5007 |
| 2021/0326161 A1* | 10/2021 | Son ....................... G06F 9/4411 |
| 2022/0035714 A1* | 2/2022 | Schultz ............... G06F 11/1438 |
| 2022/0382586 A1 | 12/2022 | Bernat et al. |

FOREIGN PATENT DOCUMENTS

| | | | |
|---|---|---|---|
| KR | 10-2021-0149576 A | 12/2021 |
| KR | 10-2022-0006490 A | 1/2022 |

* cited by examiner

APPARATUS AND METHOD FOR MANAGING MULTI-CLOUD COMPUTING INFRASTRUCTURE

CROSS REFERENCE TO RELATED APPLICATION

This application claims the benefit of Korean Patent Application No. 10-2022-0037403, filed Mar. 25, 2022, which is hereby incorporated by reference in its entirety into this application.

BACKGROUND OF THE INVENTION

1. Technical Field

The present disclosure relates generally to multi-cloud technology, and more particularly to technology for supporting effective operation and management of resources and services of multiple cloud-computing devices in a cloud-computing environment.

2. Description of the Related Art

Conventionally, the use of cloud services and computing resources for business commonly depends on a single cloud (or data center), which causes various problems, such as a risk of service interruption of the single cloud, limited computing resources and services, dependency on a specific cloud service provider, and the like. With the increasing scale of clouds all over the world, service forms and methods have been diversified, and the number of users and businesses using multiple clouds (e.g., developing and operating software using multiple clouds or cloud service providers) is increasing in order to solve the problems caused due to the use of a single cloud. However, technology for supporting the integrated use of services and resources of multiple clouds in an easy, convenient, and cost-efficient way is still at an immature stage. Also, the collective use of such diversified clouds increases the complexity of provisioning and management of a cloud infrastructure.

Meanwhile, Korean Patent No. 10-2179459, titled "System for integrated management of multi-cloud and method therefor", discloses an apparatus and method for receiving a service signal and API provided by an arbitrary cloud service in response to the cloud service, detecting conditions for one or more of a vender, a service, or an operation, or a combination thereof by analyzing the service signal and API, generating a header based on the detected conditions, and combining preset operation information with the generated header.

SUMMARY OF THE INVENTION

An object of the present disclosure is to use various types of multiple clouds in connection with each other, thereby providing the best cloud service to users and operating the same.

Another object of the present disclosure is to provide a method for autonomous operation and management of a multi-cloud infrastructure for reducing management costs.

In order to accomplish the above objects, an apparatus for managing a multi-cloud computing infrastructure according to an embodiment of the present disclosure includes one or more processors and executable memory for storing at least one program executed by the one or more processors. The at least one program receives a request for autonomous operation of a multi-cloud computing infrastructure from a user, generates an information object having a name of a namespace corresponding to the multi-cloud computing infrastructure, the autonomous operation of which is requested by the user, and previously generated universal unique identifier (UID) information, manages multiple resources included in the multi-cloud computing infrastructure, the autonomous operation of which is requested by the user, provisions the multi-cloud computing infrastructure by generating computing instances that constitute components of the multi-cloud computing infrastructure, the autonomous operation of which is requested by the user, manages lifecycles of the computing instances, and performs the autonomous operation of the multi-cloud computing infrastructure depending on operation conditions of the multi-cloud computing infrastructure, the autonomous operation of which is requested by the user.

Here, the at least one program may manage specification objects, which define specifications of computing instances predefined by multiple cloud service providers, as specification resources.

Here, the at least one program may generate the computing instances using the specification objects.

Here, the at least one program selects computing instances corresponding to requirements of the user and deploys and schedules the selected computing instances, thereby provisioning the multi-cloud computing infrastructure.

Here, the at least one program may deploy the computing instances using static information related to specifications, locations, and prices of the computing instances and dynamic information related to performance of the computing instances.

Here, the at least one program may suspend computing instances by monitoring resource utilization rates of the multi-cloud computing infrastructure and the computing instances and stop the use of resources, the usage of which exceeds a preset value.

Here, the at least one program suspends computing instances may resume the suspended computing instances depending on expected changes on resource utilization rates by monitoring resource utilization rates of the multi-cloud computing infrastructure.

Also, in order to accomplish the above objects, a method for managing a multi-cloud computing infrastructure, performed by an apparatus for managing the multi-cloud computing infrastructure, according to an embodiment of the present disclosure includes receiving a request for autonomous operation of a multi-cloud computing infrastructure from a user, generating an information object having a name of a namespace corresponding to the multi-cloud computing infrastructure, the autonomous of which is requested by the user, and previously generated universal unique identifier (UID) information, managing multiple resources included in the multi-cloud computing infrastructure, the autonomous operation of which is requested by the user, provisioning the multi-cloud computing infrastructure by generating computing instances constituting components of the multi-cloud computing infrastructure, the autonomous operation of which is requested by the user, managing lifecycles of the computing instances, and performing the autonomous operation of the multi-cloud computing infrastructure depending on operation conditions of the multi-cloud computing infrastructure, the autonomous operation of which is requested by the user.

Here, managing the multiple resources may comprise managing specification objects, which define specifications of computing instances predefined by multiple cloud service providers, as specification resources.

Here, provisioning the multi-cloud computing infrastructure may comprise generating the computing instances using the specification objects.

Here, provisioning the multi-cloud computing infrastructure may comprise selecting computing instances corresponding to requirements of the user and deploying and scheduling the selected computing instances, thereby provisioning the multi-cloud computing infrastructure.

Here, provisioning the multi-cloud computing infrastructure may comprise deploying the computing instances using static information related to specifications, locations, and prices of the computing instances and dynamic information related to performance of the computing instances.

Here, performing the autonomous operation may comprise suspending computing instances by monitoring resource utilization rates of the multi-cloud computing infrastructure and the computing instances; and stopping the use of resources, the usage of which exceeds a preset value.

Here, performing the autonomous operation may comprise resuming the suspended computing instances depending on expected changes on resource utilization rates by monitoring resource utilization rates of the multi-cloud computing infrastructure.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
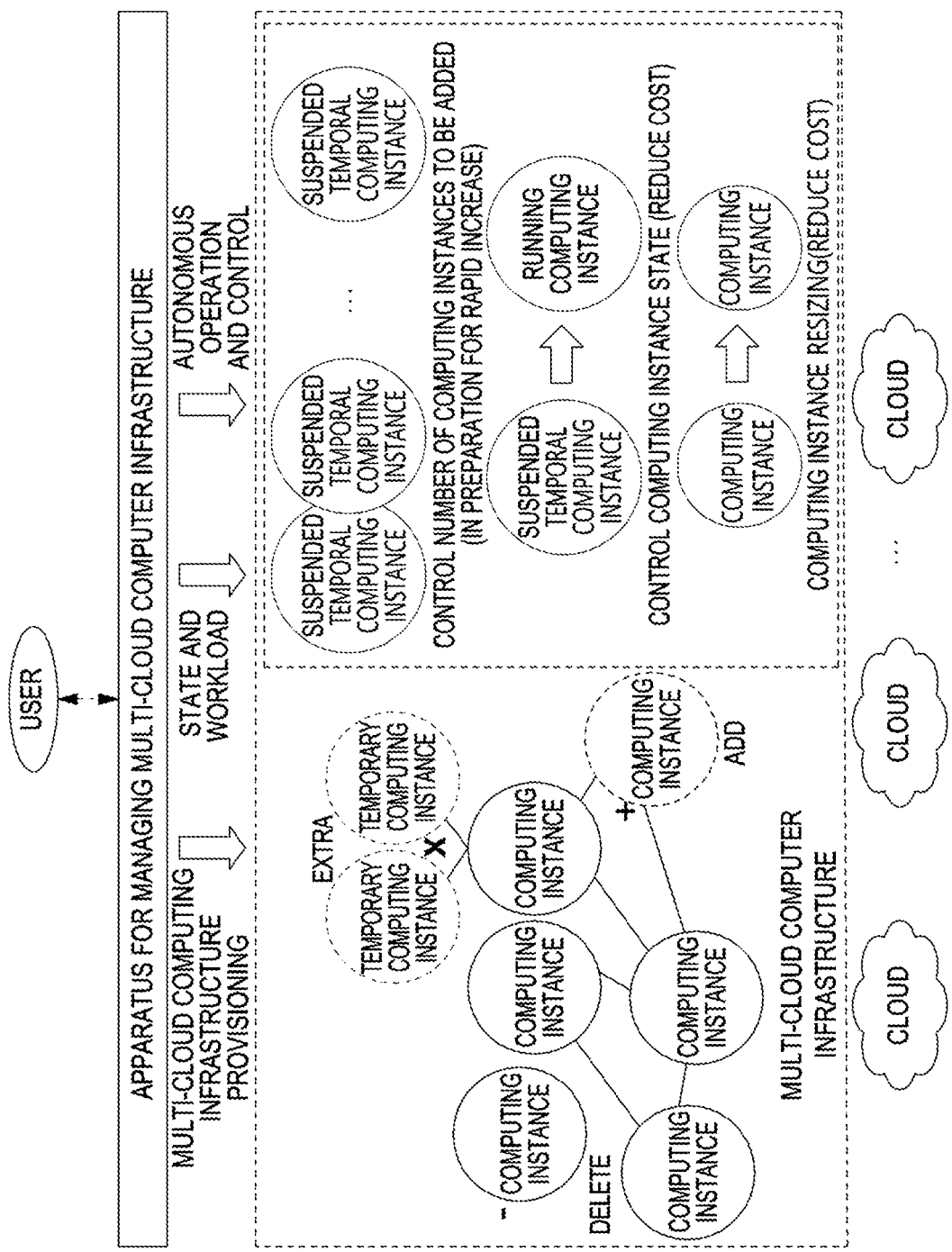
FIG. 1 is a view illustrating a system for managing a multi-cloud infrastructure according to an embodiment of the present disclosure.

The present disclosure will be described in detail below with reference to the accompanying drawings. Repeated descriptions and descriptions of known functions and configurations which have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present disclosure will be described in detail with reference to the accompanying drawings.

FIG. 1 is a view illustrating a system for managing a multi-cloud infrastructure according to an embodiment of the present disclosure.

Referring to FIG. 1, the system for managing a multi-cloud infrastructure according to an embodiment of the present disclosure may optimally provision and manage a multi-cloud computing infrastructure and perform autonomous management of the provisioned multi-cloud computing infrastructure.

Here, the multi-cloud computing infrastructure is an infrastructure group configured with resources of various clouds, and may include one or more computing instances (a virtual machine (VM) and a container machine) and storage, a network function, and a service (a DNS, a load balancer, and the like) in connection therewith. This may also be referred to as a Multi-Cloud Infra (MCI), a multi-cloud computing infra, a multi-cloud computing infra service, composed cloud services, integrated cloud services, an auto-scaling group, or the like.

The system for managing a multi-cloud computing infrastructure according to an embodiment of the present disclosure may configure and provision the optimal multi-cloud computing infrastructure (a price, a service level agreement (SLA)/a service level objective (SLO), computing performance, networking performance, a service location, a composite element, and the like) depending on various requirements of a user, and may manage the provisioned multi-cloud infrastructure.

Also, an apparatus and method for managing a multi-cloud computing infrastructure may enable a computing infrastructure to be autonomously managed through analysis of the state and workload of the multi-cloud infrastructure, thereby reducing the multi-cloud computing infrastructure management costs borne by a user.

The apparatus and method for managing a multi-cloud computing infrastructure according to an embodiment of the present disclosure may reduce the costs borne by a user and improve computing efficiency.

First, the apparatus and method for managing a multi-cloud computing infrastructure according to an embodiment of the present disclosure may provide a function of scaling down a multi-cloud computing infrastructure depending on a workload through autonomous operation.

Here, the apparatus and method for managing a multi-cloud computing infrastructure analyze the resource utilization rates of a multi-cloud infrastructure and an individual computing instance and eliminate wasted resources (stop the use of resources, the usage of which exceeds a preset value), thereby scaling down the multi-cloud computing infrastructure.

Here, the apparatus and method for managing a multi-cloud computing infrastructure may control the state (lifecycle) of a computing instance depending on a workload.

Here, the apparatus and method for managing a multi-cloud computing infrastructure may analyze the resource utilization rates of a multi-cloud infrastructure and an individual computing instance.

Here, the apparatus and method for managing a multi-cloud computing infrastructure may reduce costs by suspending (temporarily suspending) an individual computing instance before eliminating wasted resources (stopping the use of resources, the usage of which exceeds a preset value), and may prepare for a sudden rapid increase in a workload.

Also, the apparatus and method for managing a multi-cloud computing infrastructure may provide a function of scaling up a multi-cloud computing infrastructure depending on a workload.

Here, when a rapid increase in a workload is expected, the apparatus and method for managing a multi-cloud computing infrastructure provision and add one or more multi-computing instances, thereby improving stability.

Here, in order to reduce the costs for multi-computing instances, the apparatus and method for managing a multi-cloud computing infrastructure may leave only necessary instances and suspend the other instances.

Also, the apparatus and method for managing a multi-cloud computing infrastructure may reconfigure the size of an existing computing instance of a multi-cloud computing infrastructure depending on a workload.

In a Multi-cloud Computing Infrastructure (MCI), a computing instance having a low resource utilization rate (a CPU, memory, a disk, a network, and the like) and stable usage has computing performance higher than required. Accordingly, the apparatus and method for managing a multi-cloud computing infrastructure change the specification of the computing instance or reconfigure the computing instance as a new computing instance, thereby reducing the costs.

Figure 2:
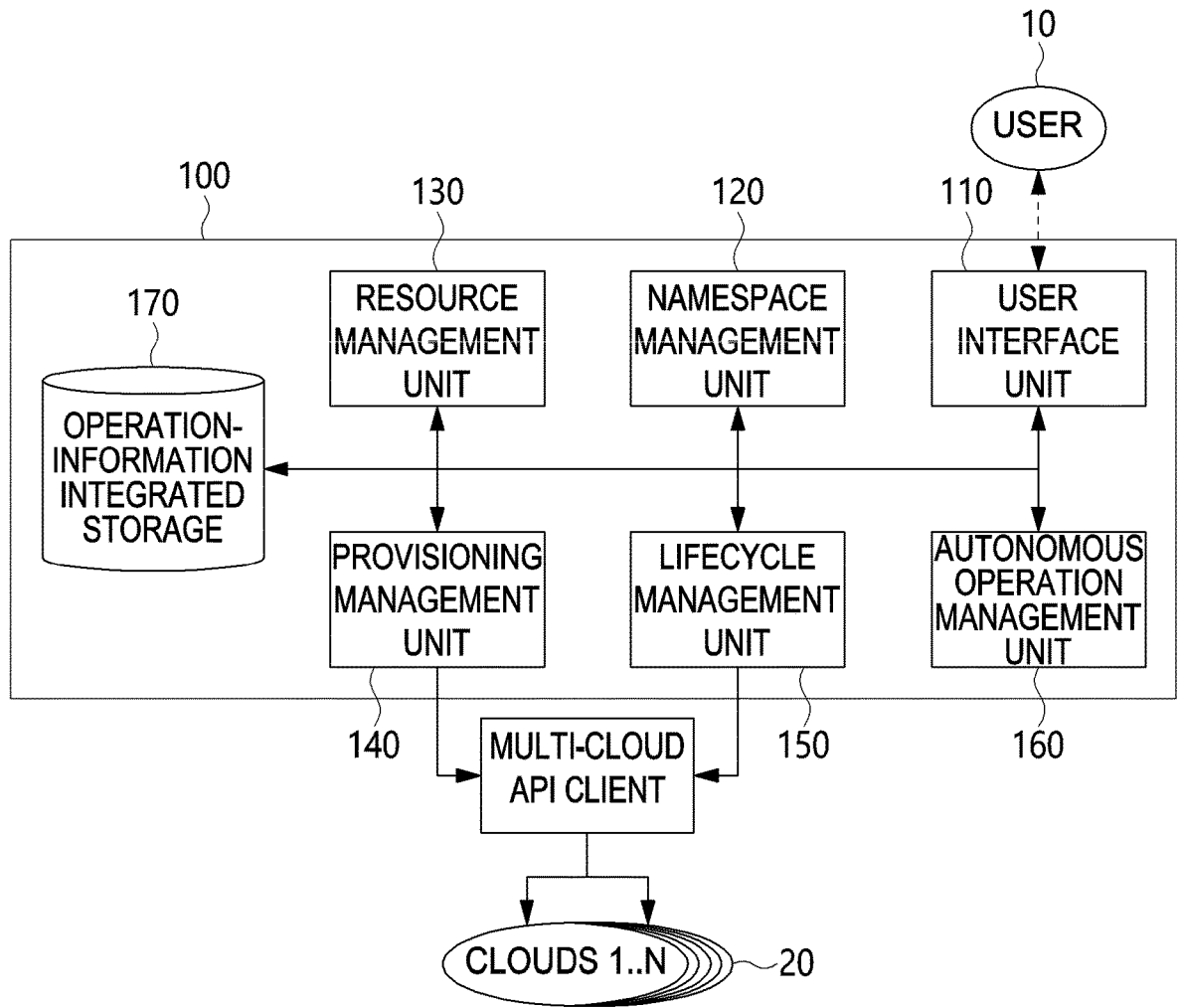
FIG. 2 is a block diagram illustrating an apparatus for managing a multi-cloud computing infrastructure according to an embodiment of the present disclosure.
Figure 3:
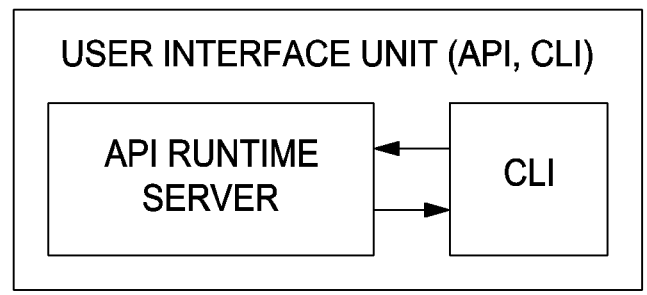
FIG. 3 is a block diagram illustrating in detail an example of the user interface unit illustrated in FIG. 2.
Figure 4:
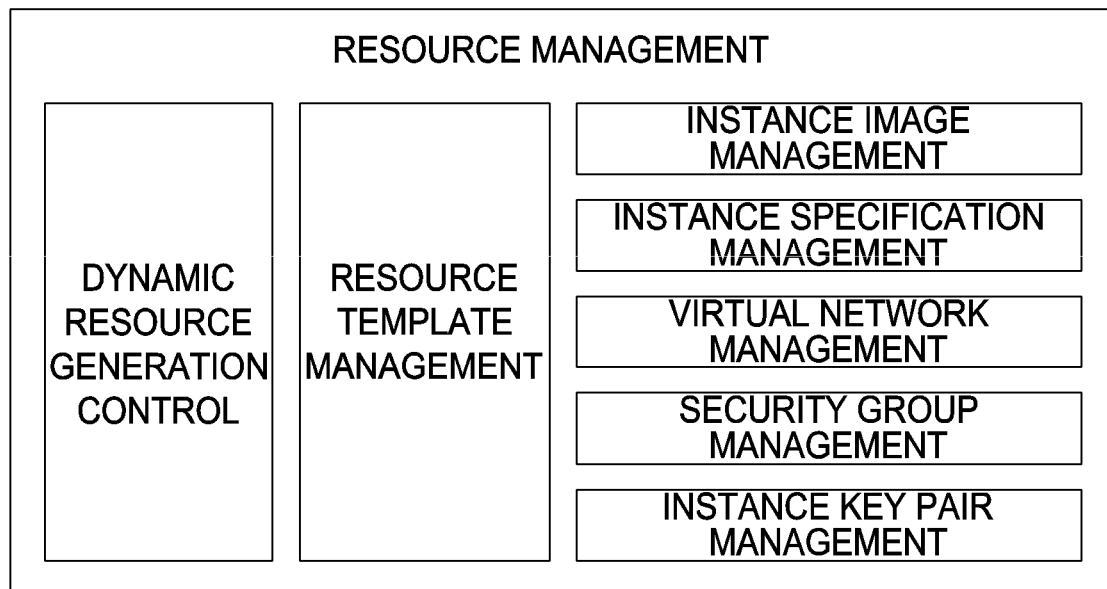
FIG. 4 is a block diagram illustrating in detail an example of the resource management unit illustrated in FIG. 2.
Figure 5:
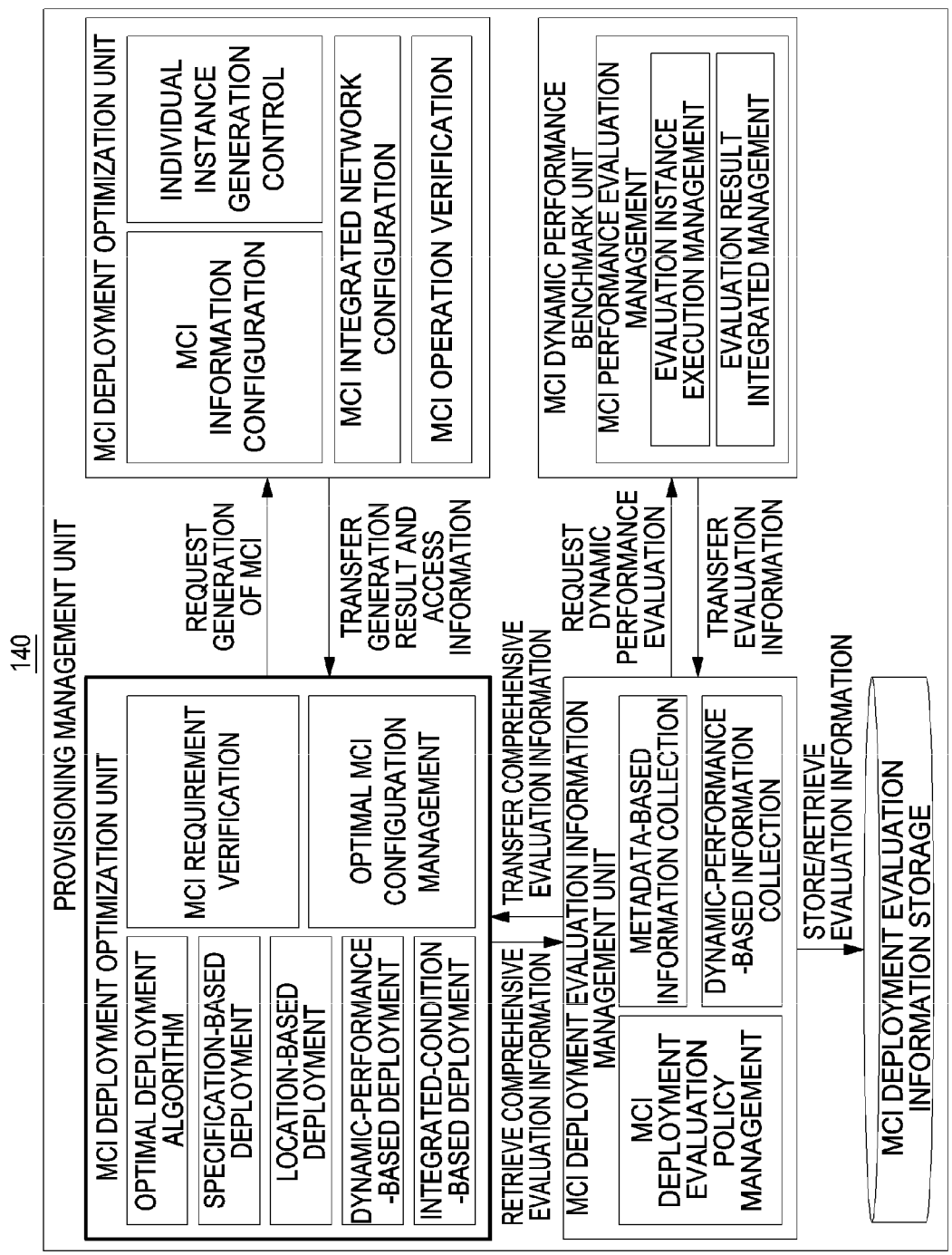
FIG. 5 is a block diagram illustrating in detail an example of the provisioning management unit illustrated in FIG. 2.
Figure 6:
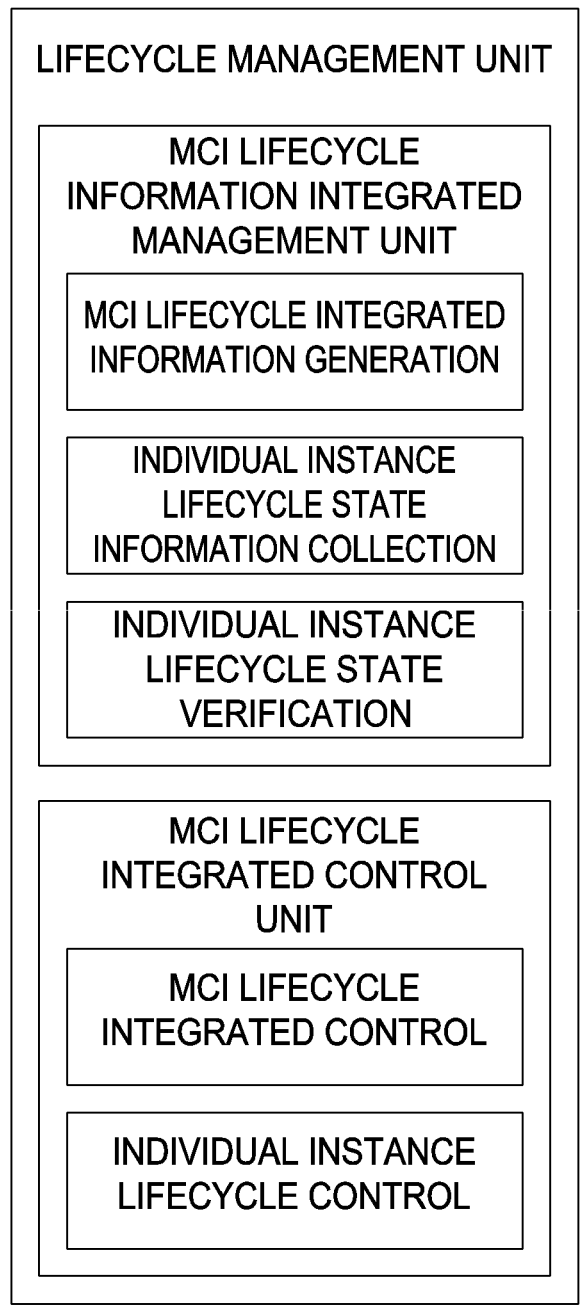
FIG. 6 is a block diagram illustrating in detail an example of the lifecycle management unit illustrated in FIG. 2.
Figure 7:
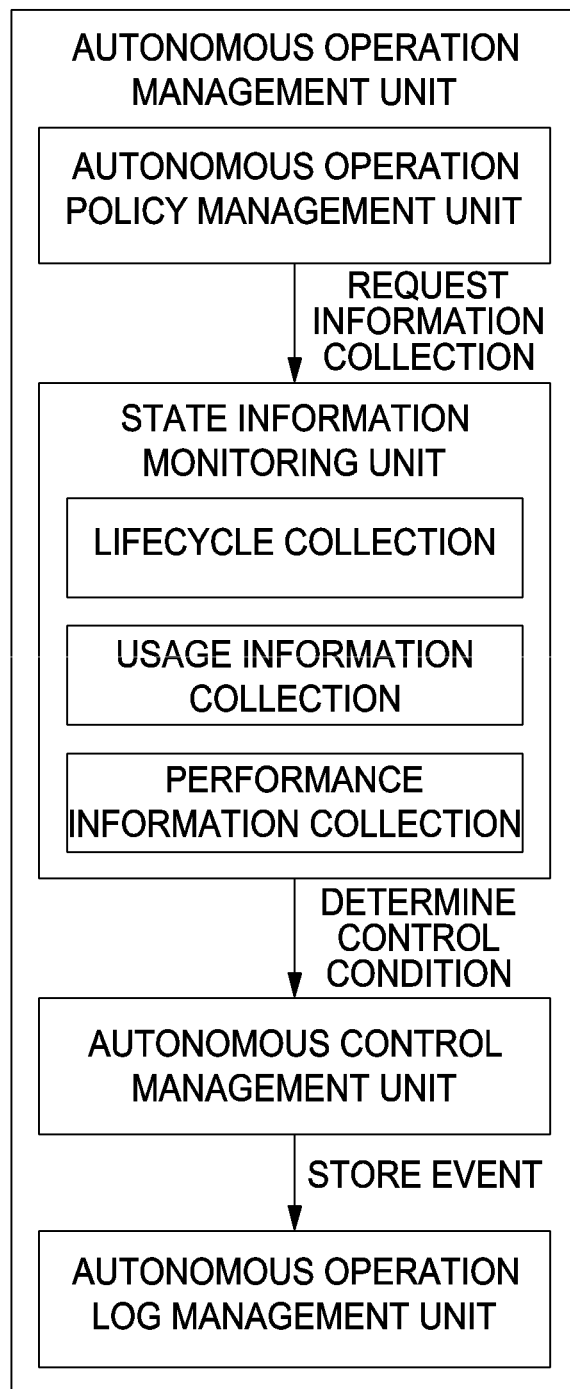
FIG. 7 is a block diagram illustrating in detail an example of the autonomous operation management unit illustrated in FIG. 2.
Figure 8:
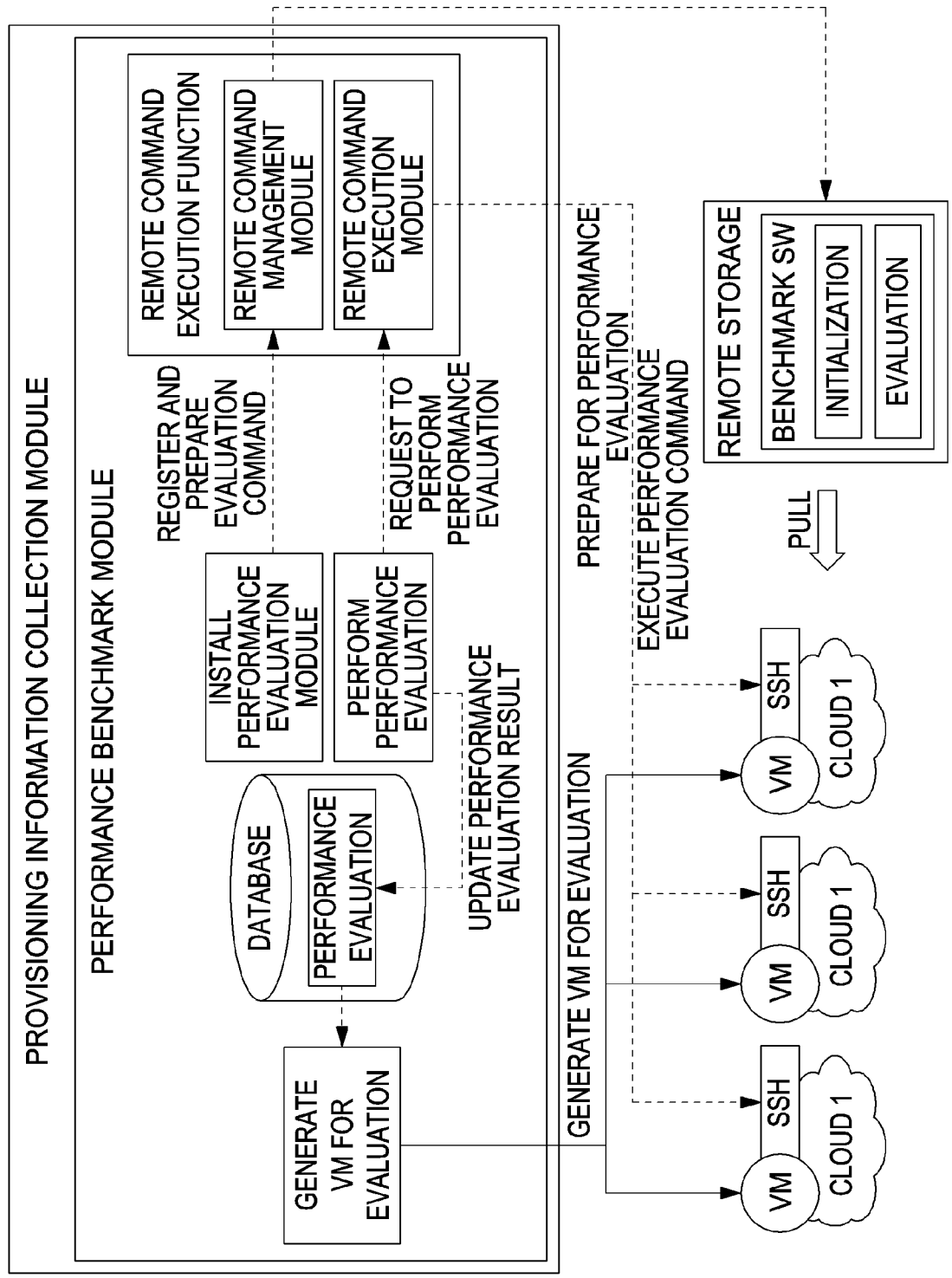
FIG. 8 is a view illustrating a provisioning information collection module for dynamic performance evaluation according to an embodiment of the present disclosure.
Figure 9:
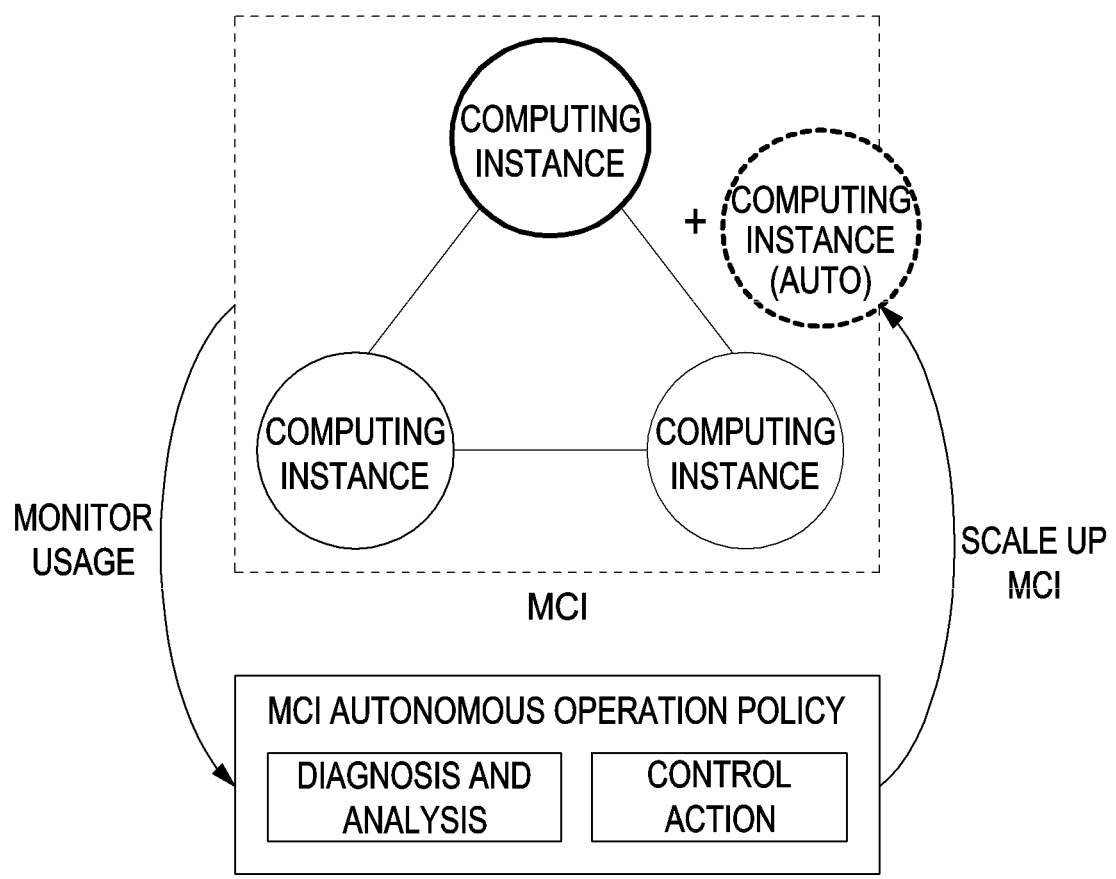
FIG. 9 is a view illustrating an MCI autonomous operation policy mechanism according to an embodiment of the present disclosure.

FIG. 2 is a block diagram illustrating an apparatus for managing a multi-cloud computing infrastructure according to an embodiment of the present disclosure. FIG. 3 is a block diagram illustrating in detail an example of the user interface unit illustrated in FIG. 2. FIG. 4 is a block diagram illustrating in detail an example of the resource management unit illustrated in FIG. 2. FIG. 5 is a block diagram illustrating in detail an example of the provisioning management unit illustrated in FIG. 2. FIG. 6 is a block diagram illustrating in detail an example of the lifecycle management unit illustrated in FIG. 2. FIG. 7 is a block diagram illustrating in detail an example of the autonomous operation management unit illustrated in FIG. 2. FIG. 8 is a view illustrating a provisioning information collection module for dynamic performance evaluation according to an embodiment of the present disclosure. FIG. 9 is a view illustrating an MCI autonomous operation policy mechanism according to an embodiment of the present disclosure.

Referring to FIG. 2, the apparatus 100 for managing a multi-cloud computing infrastructure according to an embodiment of the present disclosure includes a user interface unit 110, a namespace management unit 120, a resource management unit 130, a provisioning management unit 140, a lifecycle management unit 150, an autonomous operation management unit 160, and operation-information integrated storage 170.

Referring to FIG. 3, the user interface unit 110 may receive a request to generate a multi-cloud computing infrastructure and to perform autonomous operation from a user, and may transfer management and operation states and an operation result to the user.

The user interface unit 110 may request the namespace management unit 120 to generate and retrieve a namespace, and may request verification of a namespace and receive a verification result.

The user interface unit 110 may request the resource management unit 130 to generate and retrieve a resource.

The user interface unit 110 may transfer user requirements for MCI provisioning to the provisioning management unit 140 and request the provisioning management unit 140 to transfer a provisioning result.

The user interface unit 110 may request the lifecycle management unit 150 to control and retrieve a lifecycle.

The user interface unit 110 may request the autonomous operation management unit 160 to perform autonomous operation and to retrieve an operation result.

The namespace management unit 120 may provide functions of generating, retrieving, and deleting a namespace object.

Here, the namespace management unit 120 may generate an information object having a name of a namespace requested by a user and universal unique identifier (UID) information generated by a system.

Here, the namespace management unit 120 may show a full list of namespaces to the user through a namespace object retrieval function, and may specify a user identifier (UID) using the name of the namespace. The specified UID is basic information that is required when retrieval and control of a resource and an MCI object are requested.

Here, in order to delete a namespace object through a namespace object deletion function, the namespace management unit 120 retrieves information about resources and an MCI included therein, and may perform checking so as not to allow deletion of the namespace when the namespace includes a resource or an MCI.

The resource management unit 130 may provide management functions, such as generation, registration, retrieval, deletion, and the like of a resource.

The resource management unit 130 may perform processing on various kinds of resources (a computing instance image, a computing instance specification, a network, a connection, and the like).

Referring to FIG. 4, the resource management unit 130 may manage an image resource of a computing instance that can be included in an MCI.

The resource management unit 130 may register a computing instance image in a system for optimal provisioning and autonomous operation management of a multi-cloud computing infrastructure, and the registered image may become an object having an ID in the system for optimal provisioning and autonomous operation management of a multi-cloud computing infrastructure. The registered image may be used as a parameter when a computing instance is generated.

The resource management unit 130 may provide a user with management functions through which an image can be registered, retrieved, and deleted.

Also, the resource management unit 130 may provide a computing instance specification management function.

The resource management unit 130 may manage a computing instance specification resource of a computing instance that can be included in an MCI. The computing instance specification resource is an object in which the specification of a computing instance is defined by a cloud service provider.

The resource management unit 130 may receive registration of a computing instance specification resource from a user. The registered computing instance specification resource may become an object having an ID in the system for optimal provisioning and autonomous operation management of a multi-cloud computing infrastructure.

A computing instance specification object corresponding to the specification of a computing instance selected by the resource management unit 130 may comprise multiple computing instance specification objects depending on a cloud service provider. The computing instance specification object may be used as a parameter when a computing instance is generated.

Also, the resource management unit 130 may provide management functions through which a computing instance specification resource can be retrieved and deleted.

The main specification elements of a computing instance specification resource may include the number of vCPUs, a memory size, a storage size, a GPU, and the like.

Also, the resource management unit 130 may manage a virtual network resource that can be included in an MCI. The virtual network resource is an object in which a virtual network resource is defined by a cloud service provider.

The resource management unit 130 may receive registration of a virtual network resource provided by a cloud service provider from a user. The registered virtual network resource may become an object having an ID. The virtual network resource may be used as a parameter when a computing instance is generated. The resource management unit 130 may provide management functions through which a virtual network resource can be retrieved and deleted.

Also, the resource management unit 130 may manage (register, retrieve, and delete) a resource for accessing a computing instance included in an MCI. The resource related to access to a computing instance may include a network security group (an item group in which an accessible network port is designated) and an access security key (a key pair) for access to a computing instance through secure shell (SSH).

The provisioning management unit 140 may manage the entire procedure of generating an MCI through an MCI provisioning management function.

In order to generate an MCI, the provisioning management unit 140 is required to generate computing instances, which constitute components of the MCI, to configure the generated computing instances, and to include the same in a logical object referred to as an MCI.

In order to generate an individual computing instance, the provisioning management unit 140 optimally deploys and schedules a computing instance and selects computing instances that best suit the service requirements for each MCI, thereby provisioning an optimal MCI to a user. The detailed functions may be configured as described below.

Here, the provisioning management unit 140 may check whether there is an error in deployment requirements for the MCI requested by a user using an MCI deployment requirement review function.

Here, the provisioning management unit 140 may determine based on previously stored management information whether provisioning for the deployment requirements is possible, and when a user requirement that cannot be provisioned is included, the provisioning management unit 140 may notify the user that provisioning is impossible without performing MCI provisioning.

Also, the provisioning management unit 140 provides a function of collecting information for optimal MCI deployment.

The information for MCI deployment may be classified into static information and dynamic information.

The static information may include a specification, a location, a price, and the like, and the dynamic information may include performance information, and the like.

The provisioning management unit 140 may collect static information about computing instance specifications through an information collection function for MCI deployment, and may periodically collect dynamic performance information through a computing instance benchmark, or the like. The collected information may become base data of an optimal MCI deployment scheduling algorithm.

Referring to FIG. 8, the provisioning information collection module may be included in the dynamic-performance-based information collection module of the provisioning management unit 150 illustrated in FIG. 5.

The main components of the provisioning information collection module may include components, such as a database for storing performance evaluation information, a function of generating a computing instance for evaluation, a function of installing a performance evaluation module, a function of performing performance evaluation, and the like.

Optimal provisioning based on performance is based on performance evaluation for the specification of a computing instance, which is regarded as a service form of each cloud. Performance evaluation for the specification of a computing instance may be performed from various aspects.

In the performance evaluation, CPU computation speed (a single core|multiple cores), memory processing speed (read|write), file IO processing speed (read|write), DB processing speed (read|write), network response speed (latency, ping), network stability (jitter), network bandwidth, and the like may be evaluated.

The dynamic performance evaluation mechanism of the provisioning information collection module may first generate all computing instances for evaluation based on computing instance specifications.

Here, the provisioning information collection module may install a benchmark program, which is managed in remote storage, in a computing instance through SSH using the evaluation module installation function.

Here, the provisioning information collection module may periodically request the benchmark program, installed in the computing instance, to evaluate performance using the function of performing performance evaluation, and may continuously update the evaluation DB with the result thereof.

According to need, the provisioning information collection module may perform update based on already evaluated information, rather than dynamically performing evaluation, and may exchange information with other users.

The provisioning information collection module may perform calculation for optimal cloud infrastructure configuration (selection) using the collected evaluation data. Because various performance factors are defined, a weighted sum, which is a utility function for incorporating the respective evaluation factors for optimal deployment, may be defined as shown in Equation (1):

$$U_{Total} = w_1 \cdot U_1 + w_2 \cdot U_2 + \ldots + w_k \cdot U_k \quad (1)$$

Here, $U_{Total}$ is the total utility value, and is the utility value of each evaluation factor k. $w_k$ is an importance weight for $U_k$, and $\Sigma_{i=1}^{k} w_i = 1$ is satisfied. Using this, various performance factors are combined according to need, whereby a multi-cloud infrastructure may be configured.

For example, when a utility function such as $U_{Total} = 0.7 \cdot U_{computing\text{-}speed} + 0.3 \cdot U_{memory\_read\_speed}$ is used, a multi-cloud infrastructure is deployed based on the CPU computation speed and the memory read speed, and the CPU computation speed is assigned a higher weight than the memory read speed.

The provisioning management unit 140 may support optimal deployment for each MCI through an optimal MCI deployment scheduling function.

Optimal MCI deployment scheduling may include algorithms for performing optimal deployment based on various factors.

The provisioning management unit 140 may collect information about network latency between computing instances over multiple clouds and provide a deployment function through which the network response times of all computing instances in the MCI requested by a user is equal to or less a specific time (a few milliseconds). For example, when a network response time less than 40 milliseconds is specified in an MCI, the provisioning management unit 140 may optimally configure the MCI with only computing instances that satisfy the constraint using information about the network response speed between computing instances through the optimal MCI integrated deployment function.

Also, for optimal configuration of the MCI, the provisioning management unit 140 may include the following algorithms as conditions for optimal deployment of each computing instance.

In the case of specification-based deployment, recommendation and deployment are performed based on the specification of the computing instance requested by a user.

In the case of location-based deployment, optimal computing instances are recommended and deployed in order of proximity to the region requested by a user.

In the case of price-based deployment, computing instances are recommended and deployed in order from an instance capable of providing the specification requested by a user at the lowest cost to an instance capable of providing the specification at the highest cost.

In the case of SLA/SLO-based deployment, a computing instance is recommended and deployed based on whether the computing instance matches the SLA and SLO conditions proposed by a cloud.

In the case of performance-based deployment, recommendation and deployment of a computing instance are determined based on the performance required by a user using the information provided through an MCI deployment information collection function (a performance benchmark, and the like). Examples of performance factors of a computing instance may include computation performance, memory read/write performance, file IO performance, and the like.

In the case of network-performance-based deployment, recommendation and deployment of a computing instance are determined based on the performance required by a user using the information provided through the MCI deployment information collection function (a network performance benchmark, and the like). Examples of the network performance factors may include network latency, stability (jitter), bandwidth, security, and the like.

Deployment based on compound conditions of a computing instance is an algorithm that can be used when it is necessary to consider multiple factors in combination, and may be implemented using a weighted sum of different algorithms (an equation capable of representing user preference for each algorithm).

Also, the provisioning management unit 140 may generate an MCI object, and may generate a computing instance included therein using a computing instance generation function of a multi-cloud infrastructure interworking framework.

Here, the provisioning management unit 140 may broadly divide the step of generating each computing instance into two steps, which are the step of requesting generation and the step of configuring generation.

The provisioning management unit 140 may perform an API call for instance generation and state checking to a multi-cloud API client.

When all of the computing instances requested by a user are generated, the provisioning management unit 140 inputs generation and access information for the corresponding computing instances to an MCI object and returns the MCI object to the user. Subsequently, the lifecycle management unit 150 manages the lifecycle of the new MCI.

The lifecycle management unit 150 may provide management and control functions for the lifecycle of an MCI, that is, the state of the MCI, after the MCI is generated and provisioned to a user.

Referring to FIG. 6, the lifecycle management unit 150 manages the MCI lifecycle states, such as a running state, a suspended state, a terminated state, and the like, for each MCI and computing instances included therein, checks whether the lifecycle of the MCI managed by the system is the same as the lifecycle of the actual computing instance managed by a cloud service provider, and synchronizes the lifecycle of the MCI with the lifecycle of the actual computing instance.

Also, when a user makes a control request related to the lifecycle, the lifecycle management unit 150 may provide a function of performing the same.

The lifecycle states of an MCI and a computing instance may be defined as follows.

A running state indicates that the MCI is running.

A suspended state indicates that the MCI is suspended.

A failed state indicates that the MCI is stopped due to an error.

A terminated state indicates that the MCI is terminated.

A creating state indicates an intermediate state in which the MCI is being created.

A suspending state indicates an intermediate state for suspending the MCI.

A resuming state indicates an intermediate state for resuming the MCI.

A rebooting state indicates that the MCI is being rebooted.

A terminating state indicates an intermediate state in which termination of the MCI is being processed.

Also, the lifecycle management unit 150 may perform an instance control API call to the multi-cloud API client.

Referring to FIG. 7, the autonomous operation management unit 160 may provide a function for autonomously operating an MCI according to the policy specified by a user.

The autonomous operation management unit 160 receives state conditions for automatically operating an MCI from a user, and automatically performs a specific action when the state conditions are satisfied or unsatisfied, thereby performing autonomous operation of the multi-cloud computing infrastructure.

The autonomous operation management unit 160 may provide a mechanism capable of performing actions depending on various conditions included in the MCI autonomous operation policy of the user. The detailed functions are classified as follows.

Here, the autonomous operation management unit 160 may support registration, retrieval, and deletion of the MCI autonomous operation requirements requested by a user. The MCI autonomous operation requirements are managed in the form of a single policy, and a scheduler for autonomous operation initiates automatic control by referring to the MCI autonomous operation requirements.

The autonomous operation management unit 160 may continuously check whether the current state of the MCI matches the state condition requested by the user using monitoring information, and may perform triggering for automatic control when it determines that the current state matches the state condition. Examples of the monitoring information include a resource utilization rate, performance measurements, a lifecycle state, and the like.

An example of the method of collecting monitoring information about resource usage is as follows.

The autonomous operation management unit 160 may collect monitoring information through an agent by installing the agent in the computing instance.

Referring to FIG. 9, the autonomous operation management unit 160 may collect monitoring information provided by the system through an API of a cloud system (or a cloud service provider).

The autonomous operation management unit 160 may collect information using a protocol through which a command can be given to a computing infrastructure, such as SSH.

Also, when automatic control is triggered by performing an MCI control action, the autonomous operation management unit 160 may provide a function of performing the action requested by a user. Here, the type of the performed action may be extended.

The autonomous operation management unit 160 may reduce the costs borne by a user and improve the computing efficiency by providing an action having the following characteristics.

Also, the autonomous operation management unit 160 may provide a function of scaling down a multi-cloud infrastructure depending on a workload.

The autonomous operation management unit 160 analyzes the resource utilization rates of a multi-cloud computing infrastructure and an individual computing instance and eliminates wasted resources (stop the use of resources, the usage of which exceeds a preset value), thereby scaling down the multi-cloud infrastructure.

Also, the autonomous operation management unit 160 may provide a function of controlling a computing instance state (lifecycle) depending on the workload.

The autonomous operation management unit 160 analyzes the resource utilization rates of the multi-cloud infrastructure and the individual computing instance, and suspends (temporarily suspends) the individual computing instance before it eliminates wasted resources (stops the use of the resource, the usage of which exceeds a preset value), thereby reducing costs and preparing for a sudden rapid increase in the workload.

Also, the autonomous operation management unit 160 may provide a function of scaling up a multi-cloud infrastructure depending on the workload.

When a rapid increase in the workload is expected, the autonomous operation management unit 160 provisions and adds one or more multi-computing instances, thereby improving stability.

In order to reduce costs for multi-computing instances, the autonomous operation management unit 160 may leave only necessary instances and temporarily suspend the other instances.

Also, the autonomous operation management unit 160 may reconfigure the size of the existing computing instance of the multi-cloud infrastructure depending on the workload.

Because a computing instance having a low resource utilization rate (a CPU, memory, a disk, a network, and the like) and stable usage has computing performance higher than required in a multi-cloud infrastructure, the autonomous operation management unit 160 changes the specification of the computing instance or reconfigures the computing instance as a new computing instance, thereby reducing the costs.

The autonomous operation management unit 160 may be requested by a user to perform autonomous operation of an SLA-provisioned MCI in consideration of a total cost budget.

The autonomous operation management unit 160 may monitor the state and the usage of resources (a CPU, memory, a disk, a GPU, a network, and the like) for the MCI, the autonomous operation of which is requested.

The autonomous operation management unit 160 may analyze the MCI depending on the resource usage, and a user may appropriately scale up, scale down, or change the MCI configuration in consideration of the total cost budget.

When the average utilization rate of a specific resource in the MCI exceeds a reference (e.g., 90%) during a specific window time and when there is a temporarily suspended computing instance in the MCI, the autonomous operation management unit 160 may resume the suspended computing instance and additionally activate the same in the MCI.

When the average utilization rate of a specific resource in the MCI exceeds a reference (e.g., 90%) during a specific window time, the autonomous operation management unit 160 may generate a computing instance and add the same in the MCI, thereby scaling up the MCI.

The autonomous operation management unit 160 may set the number of computing instances to be added depending on the tendency of an increase in the utilization rate.

For example, when the gradient of the tendency is 0.9 (the minimum: 0, maximum: 1), this indicates that the workload is rapidly increasing, so the autonomous operation management unit 160 may additionally generate computing instances corresponding to 90% of the computing instances of the existing MCI in order to prepare for the rapid increase.

The autonomous operation management unit 160 may deploy the added computing instance near the computing instance that most lacks resources, and may select a specification similar to the specification of the computing instance in the existing MCI as the specification of the computing instance, in which case an upgraded specification may be automatically selected to compensate for the performance for the lacking resource.

The autonomous operation management unit 160 may run the added computing instance in the same manner as an application or service deployed in the existing computing instance. Also, the autonomous operation management unit 160 may connect a load balancer and a network service, such as a DNS or the like, to storage when necessary.

The additionally generated computing instances for the scale-up are resources for preparing for a rapid increase in the workload, but some of them may be suspended for reducing costs because they incur costs. Because a pay for the suspended computing infrastructure is minimized in the cloud, the costs may be reduced, and the suspended computing infrastructure may be quickly transitioned to a service-available state when it is resumed.

When the average utilization rate of a specific resource of the MCI is maintained equal to or less than a reference (e.g., 10%) during a specific window time and when the instance is not an essential computing instance, the autonomous operation management unit 160 may suspend the computing instance having the lowest utilization rate.

The autonomous operation management unit 160 may migrate the task performed by the corresponding computing instance and the state thereof to an activated computing instance when necessary.

The autonomous operation management unit 160 may terminate and delete instances that are not reactivated for a certain time period, among the suspended computing instances, thereby scaling down the MCI.

Also, when a load is concentrated to a specific computing instance in the MCI, if there is a suspended spare computing instance near the computing instance to which the load is concentrated, the autonomous operation management unit 160 may resume the suspended spare computing instance and distribute the load thereto, but if not, the autonomous operation management unit 160 may generate and add a new instance.

Here, when the total resource utilization rate of the MCI is decreased, the autonomous operation management unit 160 may suspend and delete the existing computing instance having low utilization.

Here, when a load is not distributed in spite of an added instance, the autonomous operation management unit 160 may upgrade the specification of the computing instance to which the load is concentrated (when vertical scaling is supported in the cloud), or may add a computing instance having a higher specification for the change of the specification, migrate the existing instance thereto, and delete the existing instance (when vertical scaling is not supported in the cloud).

Also, the autonomous operation management unit 160 may record and transfer an event in order to make a user aware of the state of the autonomous operation.

Also, the autonomous operation management unit 160 may store the automatic control policy and result in the operation-information integrated storage 170 and request retrieval therefrom.

The operation-information integrated storage 170 stores resource information and MCI information in advance, and may provide the resource information and the MCI information in response to a retrieval request from the resource management unit 130 and the provisioning management unit 140.

Figure 10:
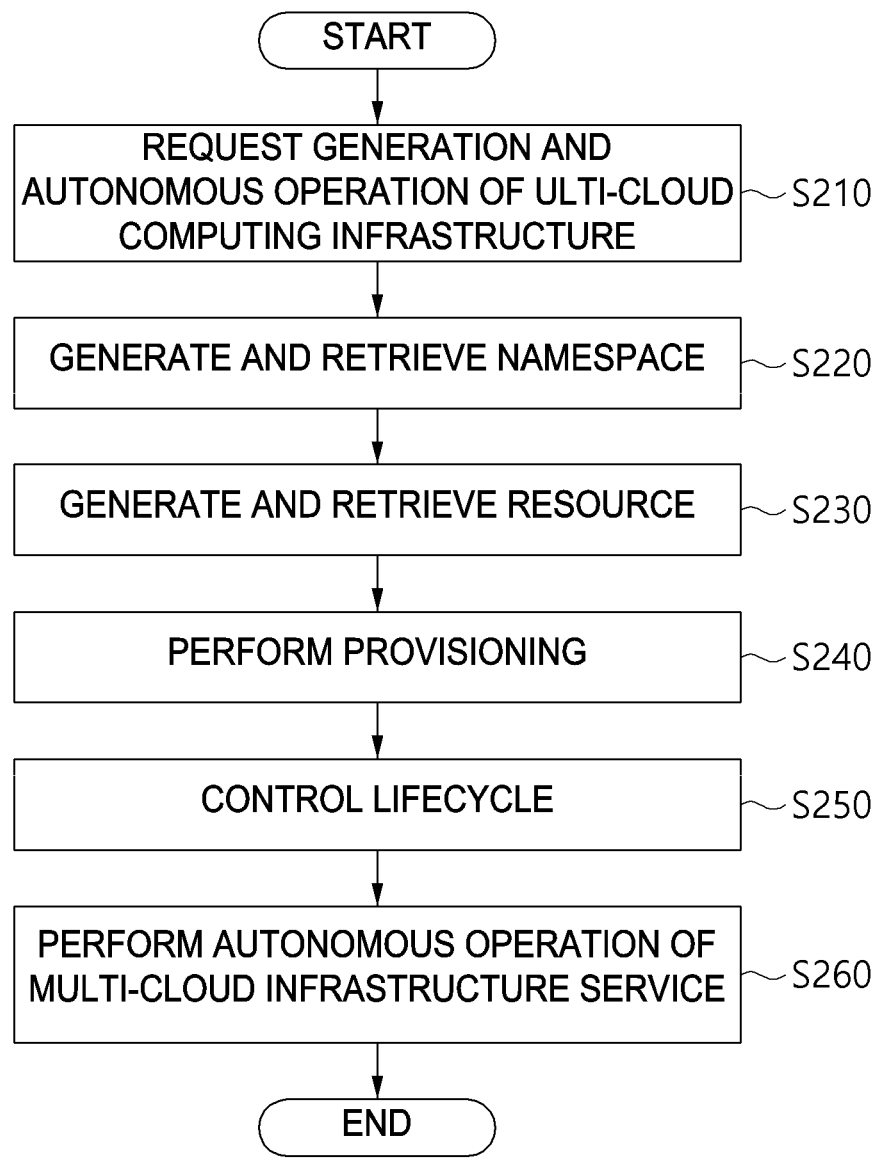
FIG. 10 is a flowchart illustrating a method for managing a multi-cloud computing infrastructure according to an embodiment of the present disclosure.

FIG. 10 is a flowchart illustrating a method for managing a multi-cloud computing infrastructure according to an embodiment of the present disclosure.

Referring to FIG. 10, at step S210, a request to generate a multi-cloud computing infrastructure and perform autonomous operation thereof may be received from a user.

At step S220, functions of generating, retrieving, and deleting a namespace object may be provided.

Here, at step S220, an information object having a name of a namespace, corresponding to the multi-cloud computing infrastructure requested by the user, and universal unique identifier (UID) information previously generated by a system may be generated.

Here, at step S220, a full list of namespaces may be shown to the user through a namespace object retrieval function, and a user identifier (UID) may be specified using the name of the namespace. The specified UID is basic information that is required when retrieval and control of a resource and an MCI object are requested.

At step S230, management functions, such as generation, registration, retrieval, deletion, and the like of a resource, may be provided.

Here, at step S230, processing may be performed on various kinds of resources (a computing instance image, a computing instance specification, a network, a connection, and the like).

Here, at step S230, an image resource of a computing instance that can be included in an MCI may be managed.

Here, at step S230, a computing instance image may be registered in a system for optimal provisioning and autonomous operation management of a multi-cloud computing infrastructure, and the registered image may become an object having an ID in the system for optimal provisioning and autonomous operation management of a multi-cloud computing infrastructure. The registered image may be used as a parameter when a computing instance is generated.

Here, at step S230, management functions through which an image can be registered, retrieved, and deleted may be provided to the user.

Here, at step S230, a computing instance specification management function may be provided.

Here, at step S230, a computing instance specification resource of a computing instance that can be included in an MCI may be managed. The computing instance specification resource is an object in which the specification of a computing instance is defined by a cloud service provider.

Here, at step S230, the computing instance specification resource may be registered by the user. The registered computing instance specification resource may become an object having an ID in the system for optimal provisioning and autonomous operation management of a multi-cloud computing infrastructure.

The computing instance specification object corresponding to the specification of the selected computing instance may comprise multiple computing instance specification objects depending on a cloud service provider. The computing instance specification object may be used as a parameter when a computing instance is generated.

Here, at step S230, management functions through which a computing instance specification resource can be retrieved and deleted may be provided.

The main specification elements of a computing instance specification resource may include the number of vCPUs, a memory size, a storage size, a GPU, and the like.

Here, at step S230, a virtual network resource that can be included in an MCI may be managed. The virtual network resource is an object in which a virtual network resource is defined by a cloud service provider.

Here, at step S230, a virtual network resource provided by a cloud service provider may be registered by the user. The registered virtual network resource may become an object having an ID. The virtual network resource may be used as a parameter when a computing instance is generated.

Here, at step S230, management functions through which a virtual network resource can be retrieved and deleted may be provided.

Here, at step S230, a resource for accessing a computing instance included in an MCI may be managed (registered, retrieved, or deleted). The resource related to access to a computing instance includes a network security group (an item group in which an accessible network port is designated) and an access security key (a key pair) for access to a computing instance through SSH.

At step S240, the entire procedure of generating an MCI may be managed through an MCI provisioning management function.

Here, at step S240, in order to generate an MCI, it is required to generate computing instances, which constitute the components of the MCI, to configure the generated computing instances, and to include the same in a logical object referred to as an MCI.

Here, at step S240, in order to generate an individual computing instance, a computing instance is optimally deployed and scheduled, and computing instances that best suit the service requirements for each MCI are selected, whereby the optimal MCI may be provisioned to the user.

Here, at step S240, whether there is an error in deployment requirements for the MCI requested by the user is checked through an MCI deployment requirement review function.

Here, at step S240, whether the deployment requirements can be provisioned is determined based on previously stored management information, and when a user requirement that cannot be provisioned is included, MCI provisioning is not performed, and the user may be notified that provisioning is impossible.

Here, at step S240, a function of collecting information for optimal MCI deployment is provided.

The information for MCI deployment may be classified into static information and dynamic information.

The static information may include a specification, a location, a price, and the like, and the dynamic information may include performance information, and the like.

Here, at step S240, static information about a computing instance specification may be collected through an information collection function for MCI deployment, and dynamic performance information may be periodically collected through a computing instance benchmark, or the like. The collected information may become base data of an optimal MCI deployment scheduling algorithm.

At step S250, functions for managing and controlling the lifecycle of an MCI may be provided.

Here, at step S250, the MCI lifecycle states, such as a running state, a suspended state, a terminated state, and the like, may be managed for each MCI and computing instances included therein, whether the lifecycle of the MCI managed by the system is the same as the lifecycle of the actual computing instance managed by a cloud service provider may be checked, and the lifecycle of the MCI may be synchronized with the lifecycle of the actual computing instance.

At step S260, state conditions for automatically operating an MCI are presented by the user, and when the state conditions are satisfied or unsatisfied, a specific action is automatically performed, whereby autonomous operation of the multi-cloud computing infrastructure may be performed.

Here, at step S260, a mechanism capable of performing actions depending on various conditions included in the MCI autonomous operation policy of the user may be provided. The detailed functions are classified as follows.

Here, at step S260, registration, retrieval, and deletion of MCI autonomous operation requirements requested by the user may be supported. The MCI autonomous operation requirements are managed in the form of a single policy, and a scheduler for autonomous operation initiates automatic control by referring to the MCI autonomous operation requirements.

Here, at step S260, whether the current state of the MCI matches the state condition requested by the user may be continuously checked through monitoring information, and triggering for automatic control may be performed when it is determined that the current state matches the state condition. Examples of the monitoring information include a resource utilization rate, performance measurements, a lifecycle state, and the like.

Figure 11:
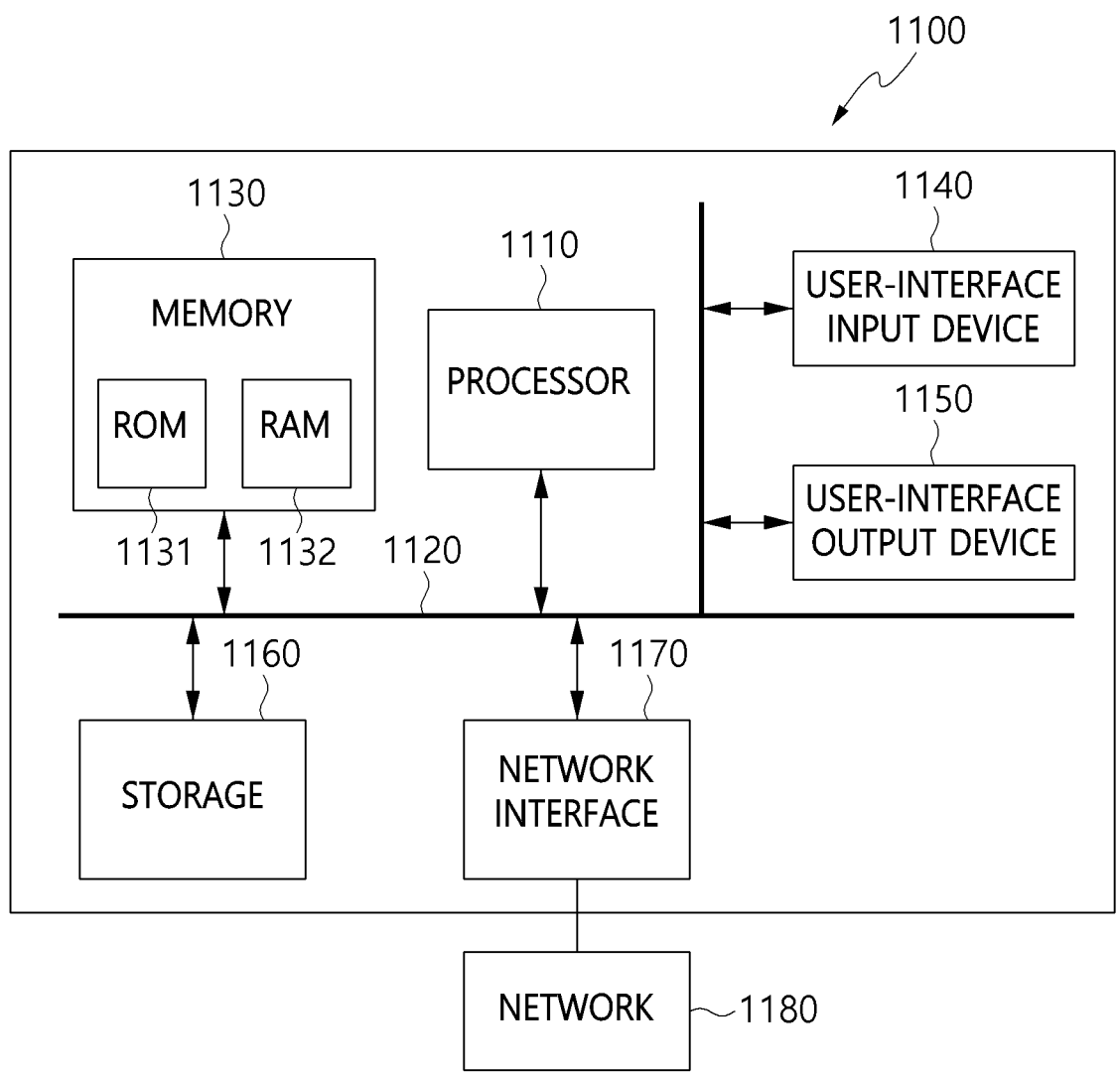
FIG. 11 is a view illustrating a computer system according to an embodiment of the present disclosure.

FIG. 11 is a view illustrating a computer system according to an embodiment of the present disclosure.

Referring to FIG. 11, the apparatus for managing a multi-cloud computing infrastructure according to an embodiment of the present disclosure may be implemented in a computer system 1100 including a computer-readable recording medium. As illustrated in FIG. 11, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for managing a multi-cloud computing infrastructure according to an embodiment of the present disclosure includes one or more processors 1110 and executable memory 1130 for storing at least one program executed by the one or more processors 1110, and the at least one program receives a request for autonomous operation of a multi-cloud computing infrastructure from a user; generates an information object having the name of a namespace corresponding to the multi-cloud computing infrastructure, the autonomous operation of which is requested by the user, and previously generated universal unique identifier (UID) information; manages multiple resources included in the multi-cloud computing infrastructure, the autonomous operation of which is requested by the user; provisions the multi-cloud computing infrastructure by generating computing instances that constitute components of the multi-cloud computing infrastructure, the autonomous operation of which is requested by the user; manages the lifecycles of the computing instances; and performs the autonomous operation of the multi-cloud computing infrastructure depending on the operation conditions of the multi-cloud computing infrastructure, the autonomous operation is requested by the user.

Here, the at least one program may manage specification objects that define specifications of computing instances predefined by multiple cloud service providers as specification resources.

Here, the at least one program may generate the computing instances using the specification objects.

Here, the at least one program selects computing instances corresponding to the requirements of the user and deploys and schedules the selected computing instances, thereby provisioning the multi-cloud computing infrastructure.

Here, the at least one program may deploy the computing instances using static information related to the specifications, locations, and prices of the computing instances and dynamic information related to the performance of the computing instances.

Here, the at least one program may suspend computing instances by monitoring the resource utilization rates of the multi-cloud computing infrastructure and the computing instances, and may stop the use of the resource, the usage of which exceeds a preset value.

Here, the at least one program suspends computing instances may resume the suspended computing instances depending on expected changes on resource utilization rates by monitoring resource utilization rates of the multi-cloud computing infrastructure.

The present disclosure may provide the best cloud service to users and operate the same by using various types of multiple clouds in connection with each other.

Also, the present disclosure may provide a method for autonomous operation and management of a multi-cloud infrastructure for reducing management costs.

As described above, the apparatus and method for managing a multi-cloud computing infrastructure according to the present disclosure are not limitedly applied to the configurations and operations of the above-described embodiments, but all or some of the embodiments may be selectively combined and configured, so the embodiments may be modified in various ways.

What is claimed is:

1. An apparatus for managing a multi-cloud computing infrastructure, comprising:
one or more processors; and
executable memory for storing at least one program executed by the one or more processors,
wherein the at least one program is configured to
receive a request for autonomous operation of a multi-cloud computing infrastructure from a user,
manage multiple resources included in the multi-cloud computing infrastructure, autonomous operation of which is requested by the user,
provision the multi-cloud computing infrastructure by generating computing instances that constitute components of the multi-cloud computing infrastructure, autonomous operation of which is requested by the user,
manage lifecycles of the computing instances, and
perform the autonomous operation of the multi-cloud computing infrastructure depending on operation conditions of the multi-cloud computing infrastructure, the autonomous operation of which is requested by the user,
wherein the at least one program deploys the computing instances using a weighted sum incorporating a respective evaluation factor of dynamic information related to performance of the computing instances, and
wherein the at least one program:
suspends computing instances by monitoring resource utilization rates of the multi-cloud computing infrastructure and the computing instances and stops use of resources, usage of which exceeds a preset value,
resumes the suspended computing instances depending on expected changes of resource utilization rates by monitoring resource utilization rates of the multi-cloud computing infrastructure,
sets a number of computing instances to be added based on a tendency of an increase in the resource utilization rates,
provides the user with a total cost budget for scale up, scale down, or change of the multi-cloud computing infrastructure configuration based on the resource utilization rates, and
performs the autonomous operation of the multi-cloud computing infrastructure in consideration of the total cost budget at the user's request, and
wherein the at least one program:
when a load is concentrated to a specific computing instance in the multi-cloud computing infrastructure, resumes a suspended spare computing instance located within a predetermined distance from the computing instance to which the load is concentrated, and
generates additional computing instances in a proportion corresponding to a gradient of the tendency of an increase in the resource utilization rates relative to the computing instances of the multi-cloud computing infrastructure, if no such spare computing instance exists.

2. The apparatus of claim 1, wherein the at least one program manages specification objects, which define specifications of computing instances predefined by multiple cloud service providers, as specification resources.

3. The apparatus of claim 2, wherein the at least one program generates the computing instances using the specification objects.

4. The apparatus of claim 3, wherein the at least one program selects computing instances corresponding to requirements of the user and deploys and schedules the selected computing instances, thereby provisioning the multi-cloud computing infrastructure.

5. The apparatus of claim 4, wherein the at least one program deploys the computing instances using static information related to specifications of the computing instances.

6. A method for managing a multi-cloud computing infrastructure, performed by an apparatus for managing the multi-cloud computing infrastructure, comprising:
receiving a request for autonomous operation of a multi-cloud computing infrastructure from a user;
managing multiple resources included in the multi-cloud computing infrastructure, autonomous operation of which is requested by the user;
provisioning the multi-cloud computing infrastructure by generating computing instances that constitute components of the multi-cloud computing infrastructure, autonomous operation of which is requested by the user;
managing lifecycles of the computing instances; and
performing the autonomous operation of the multi-cloud computing infrastructure depending on operation conditions of the multi-cloud computing infrastructure, the autonomous operation of which is requested by the user,
wherein provisioning the multi-cloud computing infrastructure comprises deploying the computing instances using a weighted sum incorporating a respective evaluation factor of dynamic information related to performance of the computing instances, and
wherein performing the autonomous operation comprises:
suspending computing instances by monitoring resource utilization rates of the multi-cloud computing infrastructure and the computing instances and stopping use of resources, usage of which exceeds a preset value;
resuming the suspended computing instances depending on expected changes of resource utilization rates by monitoring resource utilization rates of the multi-cloud computing infrastructure;
setting a number of computing instances to be added based on a tendency of an increase in the resource utilization rates;
providing the user with a total cost budget for scale up, scale down, or change of the multi-cloud computing infrastructure configuration based on the resource utilization rates; and
performing the autonomous operation of the multi-cloud computing infrastructure in consideration of the total cost budget at the user's request, and wherein performing the autonomous operation comprises:
when a load is concentrated to a specific computing instance in the multi-cloud computing infrastructure, resuming a suspended spare computing instance located within a predetermined distance from a computing instance to which the load is concentrated; and
generating additional computing instances in a proportion corresponding to a gradient of the tendency of an increase in the resource utilization rates relative to the computing instances of the multi-cloud computing infrastructure, if no such spare computing instance exists.

7. The method of claim 6, wherein managing the multiple resources comprises managing specification objects, which define specifications of computing instances predefined by multiple cloud service providers, as specification resources.

8. The method of claim 7, wherein provisioning the multi-cloud computing infrastructure comprises generating the computing instances using the specification objects.

9. The method of claim 8, wherein provisioning the multi-cloud computing infrastructure comprises selecting computing instances corresponding to requirements of the user and deploying and scheduling the selected computing instances, thereby provisioning the multi-cloud computing infrastructure.

10. The method of claim 9, wherein provisioning the multi-cloud computing infrastructure comprises deploying the computing instances using static information related to specifications of the computing instances.

\* \* \* \* \*